(No Model.)
A. J. MOYER.
CLUTCH.
No. 330,414. Patented Nov. 17, 1885.
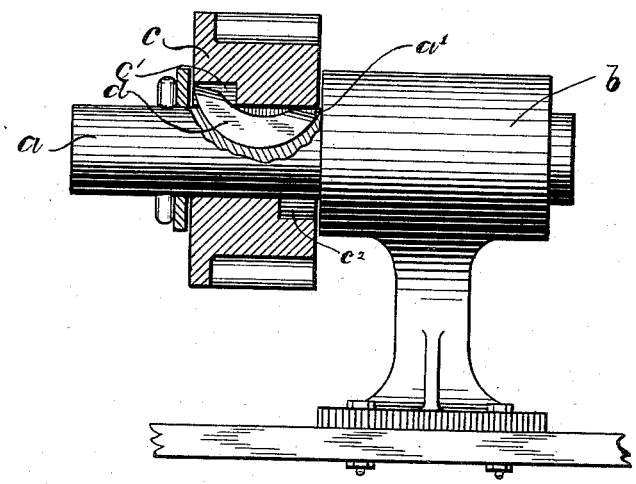
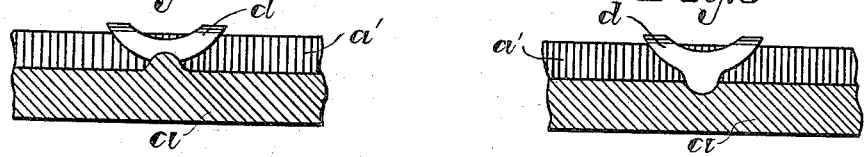
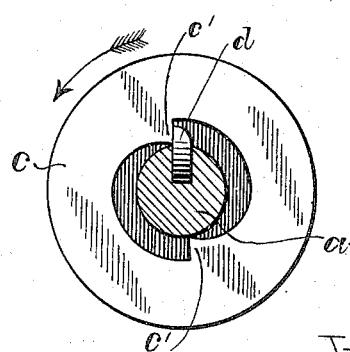

UNITED STATES PATENT OFFICE.

AARON J. MOYER, OF SPRINGFIELD, OHIO.

CLUTCH.

SPECIFICATION forming part of Letters Patent No. 330,414, dated November 17, 1885.

Application filed October 7, 1885. Serial No. 179,254. (No model.)

*To all whom it may concern:*

Be it known that I, AARON J. MOYER, a citizen of the United States, residing at Springfield, in the county of Clark and State of Ohio, have invented certain new and useful Improvements in Clutches, of which the following is a specification.

My invention relates to that class of clutches which are adapted to impart a rotary motion to any desired mechanism in one direction, but which are of such a nature that the driven mechanism will remain at rest or turn independently therefrom when the driver is revolved in the opposite direction.

The object of my invention is to provide a simple and inexpensive clutch, which will be positive in its motion and not liable to get out of repair.

In the accompanying drawings, Figure 1 is a side elevation view, shown partly in section, of a clutch mechanism embodying my invention. Fig. 2 is an end elevation, partially in section, of the same. Figs. 3 and 4 are sectional views, respectively, showing modifications of the clutching pawl or dog.

In the said drawings, $a$ represents a shaft adapted to revolve in a bearing, $b$. On the shaft $a$ is journaled a hub or sleeve, $c$, which is adapted to turn loosely thereon, except when engaged by the driving-pawl, as hereinafter set forth. The hub or sleeve $c$ is provided on either side at the center immediately around the shaft, with a series of ratchet-teeth or projections, $c'$ and $c^2$, the teeth of one series being adapted to alternate with the teeth of the other series, thus bringing each tooth of one series opposite a space in the opposite series. Any suitable number of teeth may be used in each series, two only being shown in the drawings.

Situated in a longitudinal slot, $a'$, in the driving-shaft $a$ is an oscillating pawl, $d$, the respective ends of which are adapted to engage with the alternating teeth in the sleeve or hub $c$. The ends of the pawl are beveled off on one side slightly, as shown in Fig. 2, so that as the shaft is revolved in a backward direction the respective ends of the said pawl will be alternately depressed by the teeth in the respective series in the hub or sleeve, thus producing an oscillating movement of the pawl, which allows the shaft to revolve in this direction independent of the hub or sleeve. When the shaft is revolved in a forward direction, as indicated by the arrow, the pawl will engage at one end with the teeth in one of the series in the hub or sleeve, and the said hub or sleeve will be turned therewith.

It will be seen that this clutch is positive in its action, since one end of the pawl or the other must always be elevated sufficiently to engage the teeth of one of the series.

In Fig. 1 the slot in the shaft $a$ is shown formed with a concave bottom, which forms a seat for the pawl throughout its entire length. In Figs. 3 and 4 this is shown modified, so that the pawl is provided with a bearing near its center only. This may be changed, as desired, so long as the pawl is adapted to oscillate therein to engage the teeth in the respective series.

The clutch, as above described, it will be seen, is very simple and positive in its action, and not liable to get out of order. It is particularly adapted for lawn-mowers or similar mechanism, where it is desirable to transmit a rotary motion in one direction only. When used for mechanism of this kind, the sleeve or hub $c$ may be made in the nature of a pinion, as shown in Fig. 1, so that the motion may be transmitted directly therefrom.

It will be seen that either the shaft or the sleeve may be used as the driver by changing the bevel of the teeth, the clutch being adapted to work equally well in either case.

Having thus described my invention, I claim—

1. The combination, with a shaft having a slot therein, of a pawl adapted to oscillate in said slot, and a hub or sleeve on said shaft having two series of ratchet-teeth therein immediately around the shaft, with which the ends of said pawl are adapted to engage, substantially as set forth.

2. The combination of a shaft, a pawl seated in a concave bearing in said shaft, a hub or sleeve journaled on said shaft, two alternating series of teeth in said hub or sleeve, with which the respective ends of the pawl are adapted to engage when turned in one direction, the said pawl being adapted to oscillate, so as to alternately raise and depress the respective ends thereof when turned in the opposite direction, substantially as and for the purpose set forth.

In testimony whereof I have hereunto set my hand this 2d day of October, A. D. 1885.

AARON J. MOYER.

Witnesses:
PAUL A. STALEY,
F. WILLIS BAINES.